Figure 2:
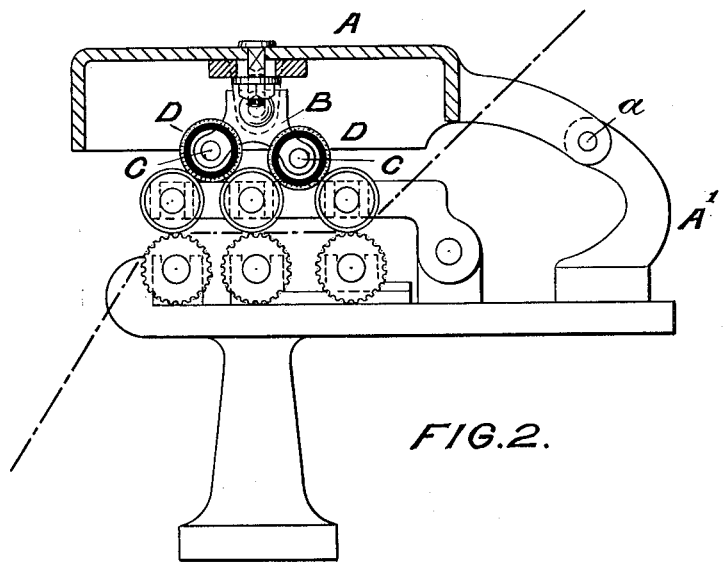

No. 880,007. PATENTED FEB. 25, 1908.
N. S. BROWN.
CLEARER FOR PREPARING FRAMES FOR COTTON AND OTHER FIBERS.
APPLICATION FILED SEPT. 11, 1905.

3 SHEETS—SHEET 1.

WITNESSES.
INVENTOR.

No. 880,007. PATENTED FEB. 25, 1908.
N. S. BROWN.
CLEARER FOR PREPARING FRAMES FOR COTTON AND OTHER FIBERS.
APPLICATION FILED SEPT. 11, 1905.

3 SHEETS—SHEET 3.

WITNESSES.
E. Howard
S. G. James.

INVENTOR.
N. Seddon Brown.

UNITED STATES PATENT OFFICE.

NORMAN SEDDON BROWN, OF WIGAN, ENGLAND.

CLEARER FOR PREPARING FRAMES FOR COTTON AND OTHER FIBERS.

No. 880,007. Specification of Letters Patent. Patented Feb. 25, 1908.

Application filed September 11, 1906. Serial No. 277,988.

*To all whom it may concern:*

Be it known that I, NORMAN SEDDON BROWN, British subject, and resident of Wigan, county of Lancaster, England, have invented certain new and useful Improvements in Clearers for Preparing Frames for Cotton and other Fibers, of which the following is a specification.

This invention is designed to provide a more efficient clearer for the rollers of preparing machines employed in the preparing of textile fibers for spinning. These clearers are affixed to the inside of a cover which is hinged or pivoted to cover the rollers so that when the cover is raised the clearers are at the same time removed from the rollers. Hitherto they have been made by fastening a strip of cloth in an endless band over two rods or bars or by pivoting two cloth covered rollers to suitable brackets. The former is objectionable in that the fly or fluff collected from the rollers forms in lumps on the surface and the latter is objectionable in that the fly or fluff collects around the pivot of the rollers and retards or stops their rotation.

My invention consists essentially in constructing the clearer of a cloth covered roller or rollers so attached to the cover as to rest loosely on the drawing rollers and at the same time to be lifted with the cover when it is raised.

The invention will be fully described with reference to the accompanying drawings.

Figure 1:
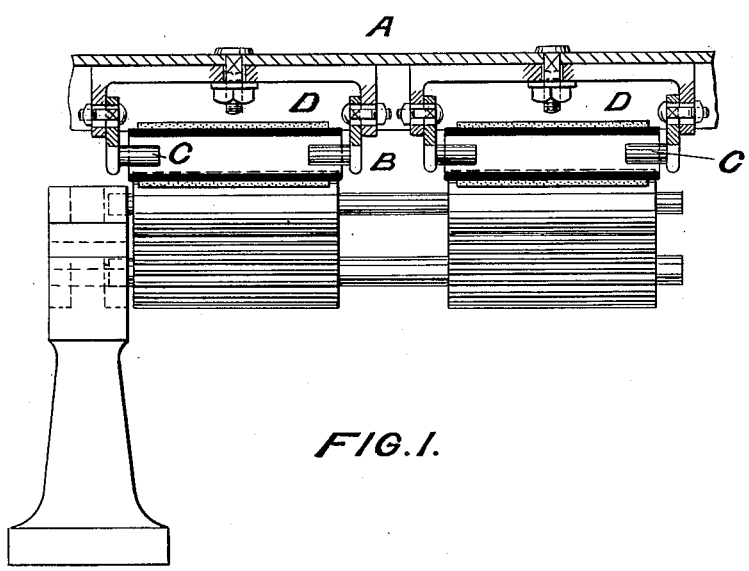
Figure 3:
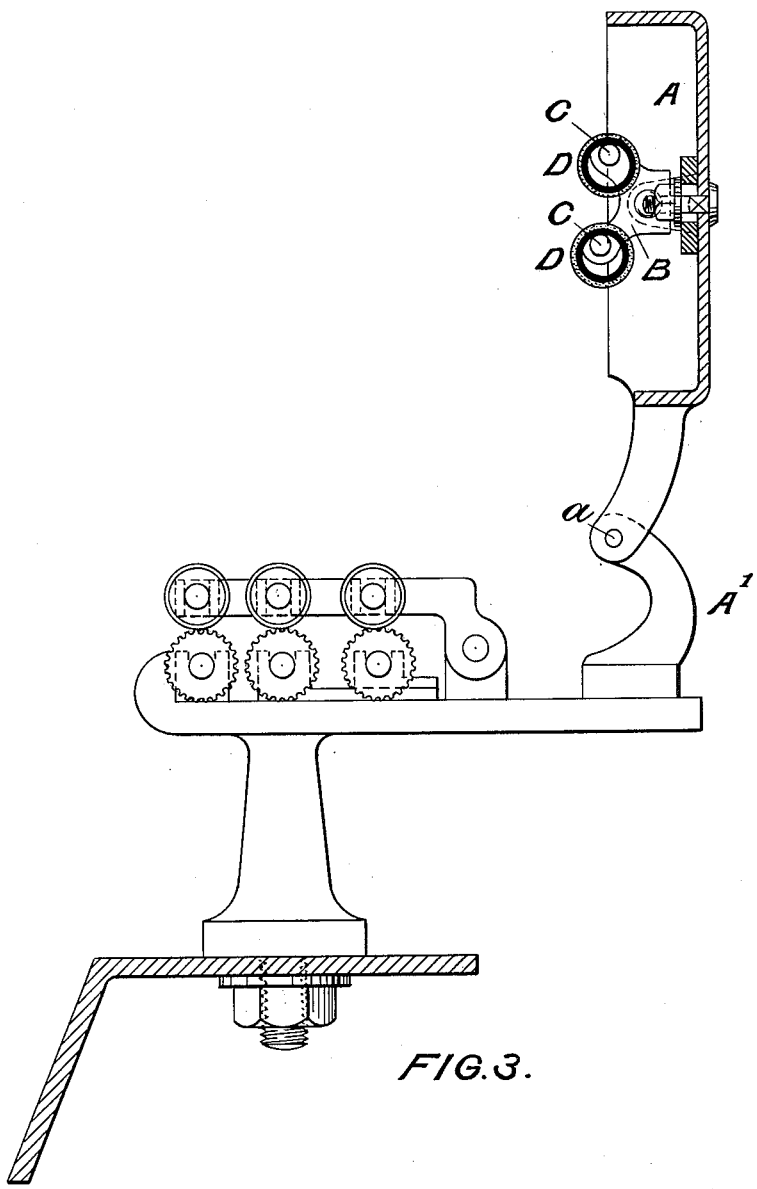
Figure 4:
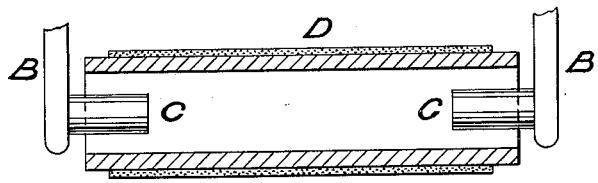
Figure 5:
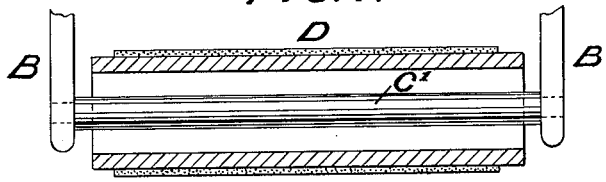
Figure 6:
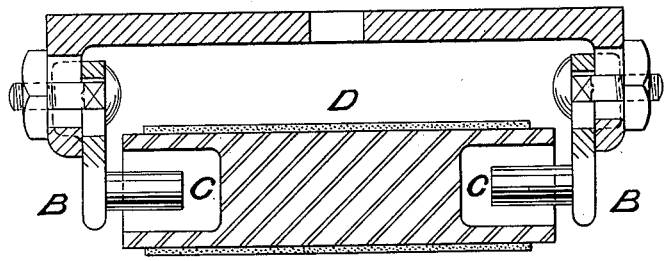
Figure 7:
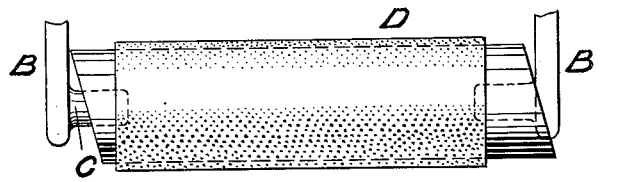
Figure 8:
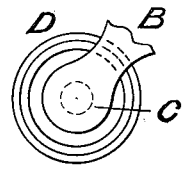
Figure 9:
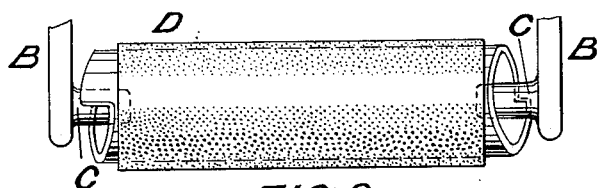

Figure 1. is a front elevation of the rollers of a slubbing or roving frame with the clearers D and cover A in section. Fig. 2. is an end elevation with the clearers and cover in transverse section the latter being in normal working position. Fig. 3. is an end elevation with the clearers and cover in transverse section the cover being raised and the clearers lifted or removed from the rollers. Fig. 4. is a longitudinal section of clearer D. Fig. 5. is a longitudinal section of clearer with a modified construction of pin. Fig. 6. is a longitudinal section showing a modified construction of clearer. Fig. 7. is an elevation of clearer with inclined ends to give it a slight longitudinal movement to and fro as it rotates. Fig. 8. is an end elevation of Fig. 7. Fig. 9. is an elevation of clearer with scroll shaped ends for the same purpose.

Inside the cover A brackets B are adjustably secured by bolts or screws each provided with pins C projecting inwardly or towards one another. The clearers D are cylindrical and each formed of a tube or of a roller with tubular ends the ends being open and much wider than the diameter of the pins C. The ends of the hollow or tubular clearers D are placed over the pins C which are very much less in diameter than the interior of the tube or roller. The pins C are in no sense pivots as the clearer rollers D revolve upon the drawing rollers altogether independent of them and their only function is to raise the clearer rollers D with the cover A. As the pins are stationary fly or fluff is not liable to accumulate upon them but should such be the case it will not interfere with the rotation of the rollers as is the case when mounted upon pivots. Instead of pins at the ends $a$, rods C' may run through the tubular clearer D, see Fig. 5.

If desired to give to the clearer D a longitudinal movement as it rotates the ends may be made inclined as at Fig. 7. or scroll shaped as in Fig. 9, or otherwise. As the clearer D rotates the one end will first press against the bracket B while the other end is below the bracket and move the clearer in one direction and then the other end will engage its bracket and move the clearer back again. This construction allows the clearers D to rotate freely upon the drawing rollers without contact with a pin or pivot while providing means for lifting the clearers with the roller cover A and it also allows the clearers D to accommodate themselves to a re-setting of the drawing rollers without requiring to be re-set or adjusted thereto.

What I claim as my invention, and desire to protect by Letters Patent is:—

1. In a clearer for preparing frames, the combination with the cover A and adjustable brackets affixed thereto of clearer rollers tubular at the ends, pins fixed to the adjustable brackets of less diameter than the interior of the clearer rollers and projecting into the rollers without contact therewith so that the rollers can rotate freely upon the drawing rollers without touching the pins and can be raised with the covers and accommodate themselves to a re-setting of the drawing rollers without being re-set, substantially as described.

2. The combination with the roller cover A of adjustable brackets B affixed thereto, pins C projecting from the brackets and a roller clearer D with tubular ends into which the pins C project without contact therewith the internal diameter of the roller being much greater than the external diameter of the pin, to give a free movement in every direction, so that while the clearers can be raised with the covers they can adjust themselves to a re-setting of the rollers without being re-set, substantially as described, and shown.

3. A roller clearer constructed of a cylindrical tube D provided with inclined ends to cause a longitudinal travel of the roller in combination with pins C, which project into it, of external diameter less than the internal diameter of the tube, upon which the tube is mounted, to permit of the adjustment of the clearers to a re-setting of the rollers without being re-set, substantially as described.

In witness whereof, I have hereunto signed my name in the presence of two subscribing witnesses.

N. SEDDON BROWN.

Witnesses:
  J. OWDEN O'BRIEN,
  B. TATHAM WOODHULL.